United States Patent
Drako et al.

(10) Patent No.: US 10,796,163 B2
(45) Date of Patent: Oct. 6, 2020

(54) SURVEILLANCE VIDEO ACTIVITY SUMMARY SYSTEM AND ACCESS METHOD OF OPERATION (VASSAM)

(71) Applicants: Dean Drako, Austin, TX (US); Steven Roskowski, Los Gatos, CA (US)

(72) Inventors: Dean Drako, Austin, TX (US); Steven Roskowski, Los Gatos, CA (US)

(73) Assignee: EAGLE EYE NETWORKS, INC., Austin, TX (US)

(*) Notice: Subject to any disclaimer, the term of this patent is extended or adjusted under 35 U.S.C. 154(b) by 171 days.

(21) Appl. No.: 16/156,031

(22) Filed: Oct. 10, 2018

(65) Prior Publication Data

US 2019/0042856 A1    Feb. 7, 2019

Related U.S. Application Data (63) Continuation-in-part of application No. 15/443,407, filed on Feb. 27, 2017, which is a continuation-in-part
(Continued)

(51) Int. Cl.
    *G06K 9/00* (2006.01)
    *H04N 19/91* (2014.01)
    (Continued)

(52) U.S. Cl.
    CPC ..... *G06K 9/00771* (2013.01); *G06K 9/00718* (2013.01); *G06K 9/00765* (2013.01);
    (Continued)

(58) Field of Classification Search
    CPC . G06K 9/00711–00778; H04N 19/107; H04N 19/146; H04N 19/154;
    (Continued)

(56) References Cited

U.S. PATENT DOCUMENTS

7,003,154 B1 *   2/2006  Peker ............... H04N 19/172
                                                        375/E7.145
9,082,018 B1 *   7/2015  Laska ............... G06F 3/04845
(Continued)

*Primary Examiner* — Sean T Motsinger
(74) *Attorney, Agent, or Firm* — Patentry; Peter G. H. Hwang (57) ABSTRACT

An apparatus provides a quick view of security events by transformation of surveillance video streams stored over many hours. Images captured at one or more video surveillance cameras are transformed into a summary of activities by triggering on contents within the views. Selected key images are bookended by anticipatory or consequential frames for better comprehension. Variable masking scopes the date-times of interest to a display user. A frame selection process is triggered by video encoding and compression indicia to eliminate duplication and inactivity. Hours of H.264 encoded video are reduced to seconds of surveillance animation. Motion indicia in video frames and pixel blocks steer the short summary. Timespans and camera views of inactivity are purged from the summary. To meet time management budgets, the report is transmitted to a display/selection apparatus as a mix of still images and video activity glimpses.

3 Claims, 6 Drawing Sheets

Related U.S. Application Data of application No. 14/479,349, filed on Sep. 7, 2014, now Pat. No. 9,648,355.

(60) Provisional application No. 61/949,526, filed on Mar. 7, 2014.

(51) Int. Cl.
   *H04N 19/107* (2014.01)
   *H04N 19/146* (2014.01)
   *H04N 19/172* (2014.01)
   *H04N 19/154* (2014.01)
   *H04N 7/18* (2006.01)
   *H04N 19/48* (2014.01)

(52) U.S. Cl.
   CPC ............. *H04N 7/18* (2013.01); *H04N 19/107* (2014.11); *H04N 19/146* (2014.11); *H04N 19/154* (2014.11); *H04N 19/172* (2014.11); *H04N 19/48* (2014.11); *H04N 19/91* (2014.11)

(58) Field of Classification Search
   CPC ...... H04N 19/172; H04N 19/48; H04N 19/91; H04N 7/18; H04N 7/188
   See application file for complete search history.

(56) References Cited

U.S. PATENT DOCUMENTS

| | | | | |
|---|---|---|---|---|
| 10,210,620 | B2* | 2/2019 | Peleg | G11B 27/00 |
| 2004/0086180 | A1* | 5/2004 | Divakaran | G06K 9/00711 |
| | | | | 382/181 |
| 2006/0284978 | A1* | 12/2006 | Girgensohn | G06K 9/00711 |
| | | | | 348/143 |
| 2008/0018783 | A1* | 1/2008 | Chen | H04N 19/48 |
| | | | | 348/402.1 |
| 2009/0083790 | A1* | 3/2009 | Wang | G06K 9/00751 |
| | | | | 725/38 |
| 2010/0104261 | A1* | 4/2010 | Liu | G11B 27/34 |
| | | | | 386/241 |
| 2010/0220215 | A1* | 9/2010 | Rubinstein | G06F 15/8015 |
| | | | | 348/231.99 |
| 2011/0317982 | A1* | 12/2011 | Xu | G06F 16/739 |
| | | | | 386/241 |
| 2012/0170803 | A1* | 7/2012 | Millar | G06F 16/783 |
| | | | | 382/103 |
| 2015/0117703 | A1* | 4/2015 | Peng | G06K 9/00718 |
| | | | | 382/103 |
| 2015/0169960 | A1* | 6/2015 | Laksono | G06K 9/4652 |
| | | | | 382/170 |
| 2015/0278585 | A1* | 10/2015 | Laksono | H04N 21/21805 |
| | | | | 382/103 |
| 2016/0086462 | A1* | 3/2016 | Meganathan | G11B 27/34 |
| | | | | 348/155 |
| 2016/0239711 | A1* | 8/2016 | Gong | G06F 16/735 |
| 2016/0292511 | A1* | 10/2016 | Ayalasomayajula | G06K 9/00751 |
| 2017/0213086 | A1* | 7/2017 | Cao | G11B 27/105 |
| 2017/0261264 | A1* | 9/2017 | Wang | F27D 21/0021 |
| 2018/0113577 | A1* | 4/2018 | Burns | H04N 21/47217 |
| 2018/0295428 | A1* | 10/2018 | Bi | H04N 21/8549 |
| 2018/0349708 | A1* | 12/2018 | van Hoof | G08B 13/19656 |
| 2019/0035091 | A1* | 1/2019 | Bi | G08B 13/19602 |
| 2019/0042856 | A1* | 2/2019 | Drako | H04N 19/91 |
| 2019/0130192 | A1* | 5/2019 | Kauffmann | G06K 9/00765 |
| 2019/0243853 | A1* | 8/2019 | Narasimha | G06K 9/00288 |
| 2019/0244052 | A1* | 8/2019 | Narasimha | G06K 9/00288 |
| 2019/0286913 | A1* | 9/2019 | Kawai | H04N 21/21805 |
| 2020/0143844 | A1* | 5/2020 | Lawlor | G11B 27/34 |

* cited by examiner

SURVEILLANCE VIDEO ACTIVITY SUMMARY SYSTEM AND ACCESS METHOD OF OPERATION (VASSAM)

CROSS-REFERENCE TO RELATED APPLICATIONS

The present applicant is a continuation-in-part application of Ser. No. 15/443,407 "Adaptive Security Camera Image Compression Method of Operation" which is incorporated by reference in its entirety and benefits from its priority dates.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Technical Field

The disclosure relates to video surveillance security systems.

Background

What is known is that even manned security systems suffer from attention deficit when infrequently changing images are continuously displayed. An observer's mental model may overcome any incongruous change in a view. Additionally, many establishments can only afford occasional review of surveillance recordings.

As is known, data storage is made more efficient by video compression techniques based on frequency transformation and motion detection.

What is needed is a way to conserve human bandwidth allocated to monitor and respond to ever increasing video content captured on rapidly scaling video surveillance equipment and storage networks.

SUMMARY OF INVENTION

The invention eliminates hours of uninteresting surveillance imagery to provide a quick summary of security events playable in seconds on a hand-held display.

An apparatus receives a stream of encoded video frames, typically stored over one or more days, and transforms it into a succinct surveillance animation.

The method may be operable by photo sensors for daylight/dark, or by clocks to include or exclude ranges of date-time encoded within the video streams.

Self-contained video frames such as those encoded as H.264 or H.265 I-frames are flagged as Selected Key Images (SKI) to fulfill or anchor the end product of a transformation process.

Referential video frames which encode changes from self-contained video frames within pixel blocks, such as those encoded as P-frames are selected by a method to provide context pre or post selected key image which forms a video glimpse of a security activity such a entering, exiting, or transiting a visual field. For a fixed camera, a group of pixel blocks may represent the view of interest.

The method of the apparatus has several major steps: receiving (from storage) a stream of encoded video frames (e.g. H.264 MPEG); selecting Key Images (SKI) from the stream (e.g. self-contained I-frames); triggering acquisition of Event Glimpses (SKI plus X pre-roll and Y post-roll frames); and transforming Triggered Event Glimpses by encoding and compression into a succinct surveillance animation.

Within this patent application, inventor defines and uses the terms pre-roll and post-roll to mean one or more video images which when combined surround a key frame in time to visually animate a motion. Analogous to the film usage "A period of time during which the camera rolls but before the action begins." Within this patent application, inventor defines and uses the postroll as a backformation antonym of preroll to mean a period of time during which the camera rolls but after the action ends. The intended effect is that of backing up a video stream to before a key frame of an event e.g. door completely open to display the door beginning to open and continue until a person has crossed the view. A plurality of video streams is summarized into an index and storyboard analogous to a movie "trailer" which can be transmitted daily to an interested party. As is known, "trailer" is an historical term from reel-based film distribution but conventionally refers to short previews of cinematic products. A surveillance "trailer" includes selectable anchor frames, video activity glimpses, and graphic charts of text tables. More details are presented upon interaction with the display apparatus.

Changes in video compression efficiency and other event measures of activity distinguish anchor frames in each stream. High video compression metrics suggest a lack of interesting activity and content. Movement or other changes trigger the selection of an anchor frame. In an embodiment of compression technology, an anchor frame may be called a key frame upon which delta or difference frames are derived.

Anchor frames are available as still images for display and for image and facial recognition.

A timespan and presentation of a video glimpse is determined to bookend each anchor frame. The initiation of a movement and the consequence of an activity are presented in analogy to a sound bite. Some glimpses can be suppressed as a function of their content according to subscriber history or annotations.

To meet time management budgets, the report is transmitted to a display/selection apparatus as a mix of still images and video activity glimpses.

BRIEF DESCRIPTION OF DRAWINGS

The foregoing and other objects, aspects, features, and advantages of the disclosure will become more apparent and better understood by referring to the following description taken in conjunction with the accompanying drawings, in which.

DETAILED DESCRIPTION OF INVENTION

An exemplary system transmits to a subscriber a daily email with a video attached that it is about 60 seconds long that "summarizes" the day's activity on at least one camera. Business owner or homeowner gets a short video giving an idea of what happened that day.

In an embodiment of the invention, the apparatus performs a first method to transform raw surveillance video into a summary including: receiving from storage, a stream of encoded video frames e.g. H.264 MPEG; masking out frames having date-time within a range e.g. 1 am-11 am; selecting key images from among unmasked frames e.g. I-frames; and stitching said selected key images into a succinct surveillance animation.

In an embodiment of said first method, selecting key images further includes de-duplicating frames by video content such as by size, signature, hash, checksums, or other pixel related indicia.

In an embodiment of said first method, selecting key images further includes determining a sample rate to achieve a range of animation length in seconds or frames; and sampling frames from the otherwise selected key images.

In another embodiment of the invention, the apparatus performs a second method to transform raw surveillance video into a second summary including: receiving from storage, a stream of encoded video frames; decoding the stream of encoded video frames; masking in frames captured during a date-time range set by a daylight/dark sensor; decoding motion indicia of pixel blocks within the masked-in frames; triggering event glimpses; and re-encoding the triggered event glimpses into a succinct surveillance animation.

In an embodiment of the second method, decoding motion indicia includes e.g. frequency coefficients, colors, edges, or H.265 and MPEG-H Motion Vectors.

In an embodiment of the second method, triggering event glimpses includes: designating an anchor frame by locally maximum motion indicia.

In an embodiment of the second method, triggering event glimpses includes: designating an anchor frame by intrusion of a motion block into a view sector of the frame.

In an embodiment of the second method, triggering event glimpses includes: designating an anchor frame by transit of a motion block across a boundary within the frame.

In an embodiment of the second method, triggering event glimpses includes: determining a quota for frames desired in a succinct surveillance animation; and incorporating frames before and after each anchor frame until the quota is fulfilled.

In an embodiment of the second method, re-encoding the triggered event glimpses includes: merging streams from a plurality of cameras into a single interleaved video stream of triggered event glimpses.

One aspect of the invention is a method performed by an apparatus to transform video surveillance files into a visual summary of security events, the method including steps as follows: receiving, from computer-readable storage media, a stream of video images captured by a surveillance camera and encoded in H.264 MPEG format; masking out, by a range of date-time, video image frames of disinterest; selecting key images among unmasked frames; and stitching together selected key images into a succinct surveillance animation, whereby time consumed in reviewing surveillance video is reduced.

In an embodiment, selecting key images among unmasked frames comprises: selecting self-contained frames encoded as I-frames by an H.264 MPEG compatible codec.

In an embodiment, selecting key images among unmasked frames further comprises: determining a range of animation length; and de-duplicating selected key images to achieve the range of animation length wherein animation length is one of the group number of frames and number of seconds for streaming.

In an embodiment, the method also includes steps for triggering event glimpses by: determining a sample rate to achieve the range of animation length; and sampling video frames from otherwise selected key images at said sample rate.

Another aspect of the invention is a second method performed by an apparatus to transform video surveillance files into a visual summary of security events associated with motion, the method includes performing by a processor, steps as follows: receiving at least one stream of encoded video frames from computer-readable non-transient media; decoding said at least one stream of encoded video frames; masking-in frames captured during a date-time range of said decoded video frames; decoding motion indicia of pixel blocks within said masked-in frames; triggering event glimpses by said motion indicia of pixel blocks; and re-encoding said triggered event glimpses into a succinct surveillance summary, whereby a stream of encoded video frames is transformed by an apparatus into a visual summary of security events associated with motion captured within a date-time range.

In an embodiment, the method also includes steps for triggering event glimpses by: designating at least one anchor frame by motion indicia of a group of pixel blocks transiting at least one demarcation within the video frame.

In an embodiment, the method also includes steps for triggering event glimpses by: designating at least one anchor frame by motion indicia within pixel blocks above a threshold value; determining a quota for video frames desired for said visual summary of security event; and incorporating video frames before and after each anchor frame until said quota is fulfilled, wherein said quota is a range of values.

In an embodiment, the method also includes steps for triggering event glimpses by: receiving a stream of location indicia associated with date-time values; and annotating each anchor frame with at least one location indicia of date-time propinquity.

In an embodiment, the method also includes: receiving a plurality of streams of encoded video frames captured at one or more cameras from computer-readable non-transient media; annotating location indicia to each video frame; merging streams from the plurality of cameras into a single interleaved stream of event glimpses; and encoding a split screen view of event glimpses which overlap in date-time.

Another aspect of the invention is a system comprising at least one network coupling a plurality of fixed and body-worn surveillance cameras and a plurality of mobile displays to an apparatus for transforming streams of encoded video frames into a succinct surveillance animation, wherein said apparatus comprises a processor, a computer-readable non-transient media for storage, a circuit for stitching selected video frames into a visual summary of security events, a circuit for decoding and encoding video frames, a circuit for decoding motion and location indicia, a circuit for sampling and de-duplicating video frames, and a circuit for excluding video frames by date-time and by motion indicia.

Figure 1:
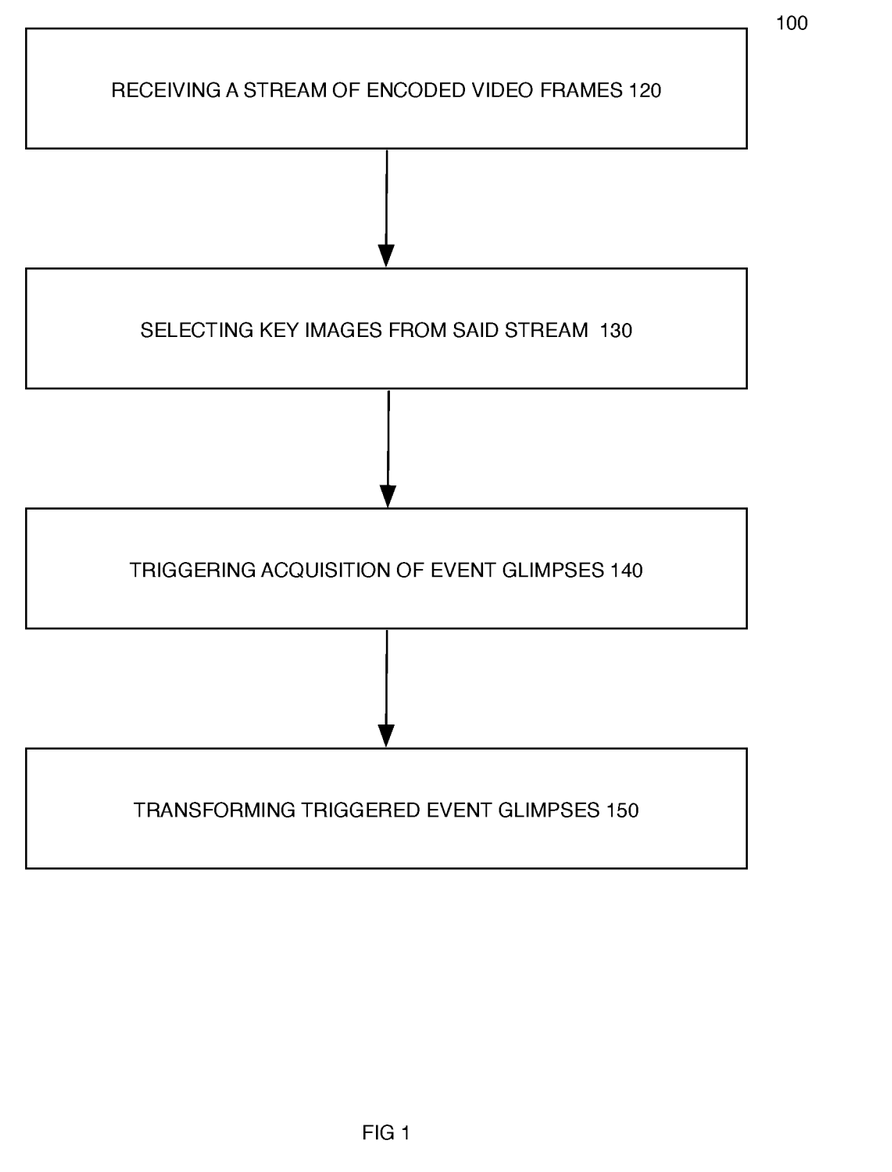
FIG. 1 is a flowchart of method steps of an apparatus for transformation of a stream of encoded video frames such as provided by a conventional security surveillance camera.

Referring now to the exemplary figures and other non-limiting embodiments provided for clarification of aspects of the invention without constraining the breadth of the inventive concepts:

FIG. 1 is a flowchart of method steps of an apparatus for transformation of a stream of encoded video frames such as provided by a conventional security surveillance camera comprising the steps receiving a stream of encoded video frames 120; selecting key images from said stream 130; triggering acquisition of event glimpses 140; and transforming triggered event glimpses 150.

Figure 2:
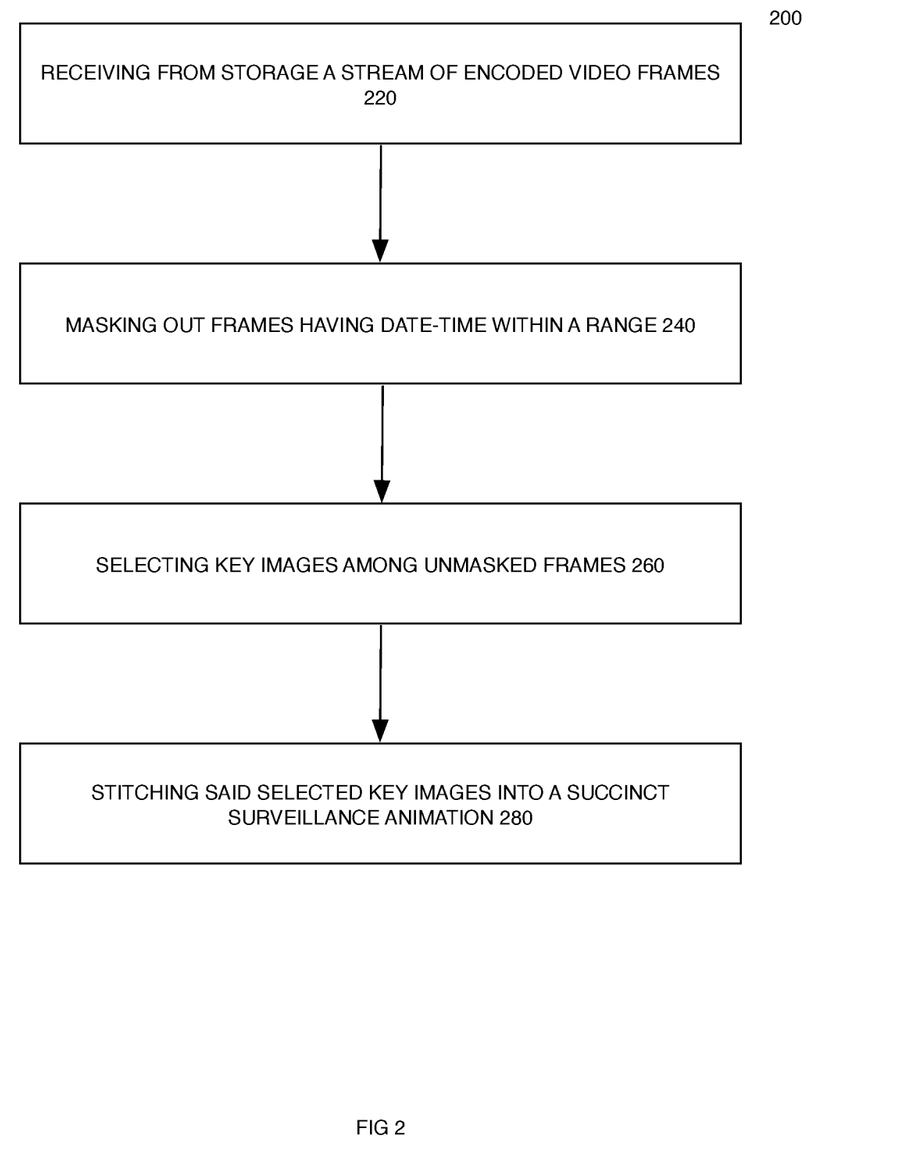
FIG. 2 is a flowchart of a method which includes selecting or deselecting frames from the stream.

FIG. 2 is a flowchart of a method which includes selecting or deselecting frames from the stream comprising receiving from storage a stream of encoded video frames 220; masking out frames having date-time within a range 240; selecting key images among unmasked frames 260; and, stitching said selected key images into a succinct surveillance animation 280.

Figure 3:
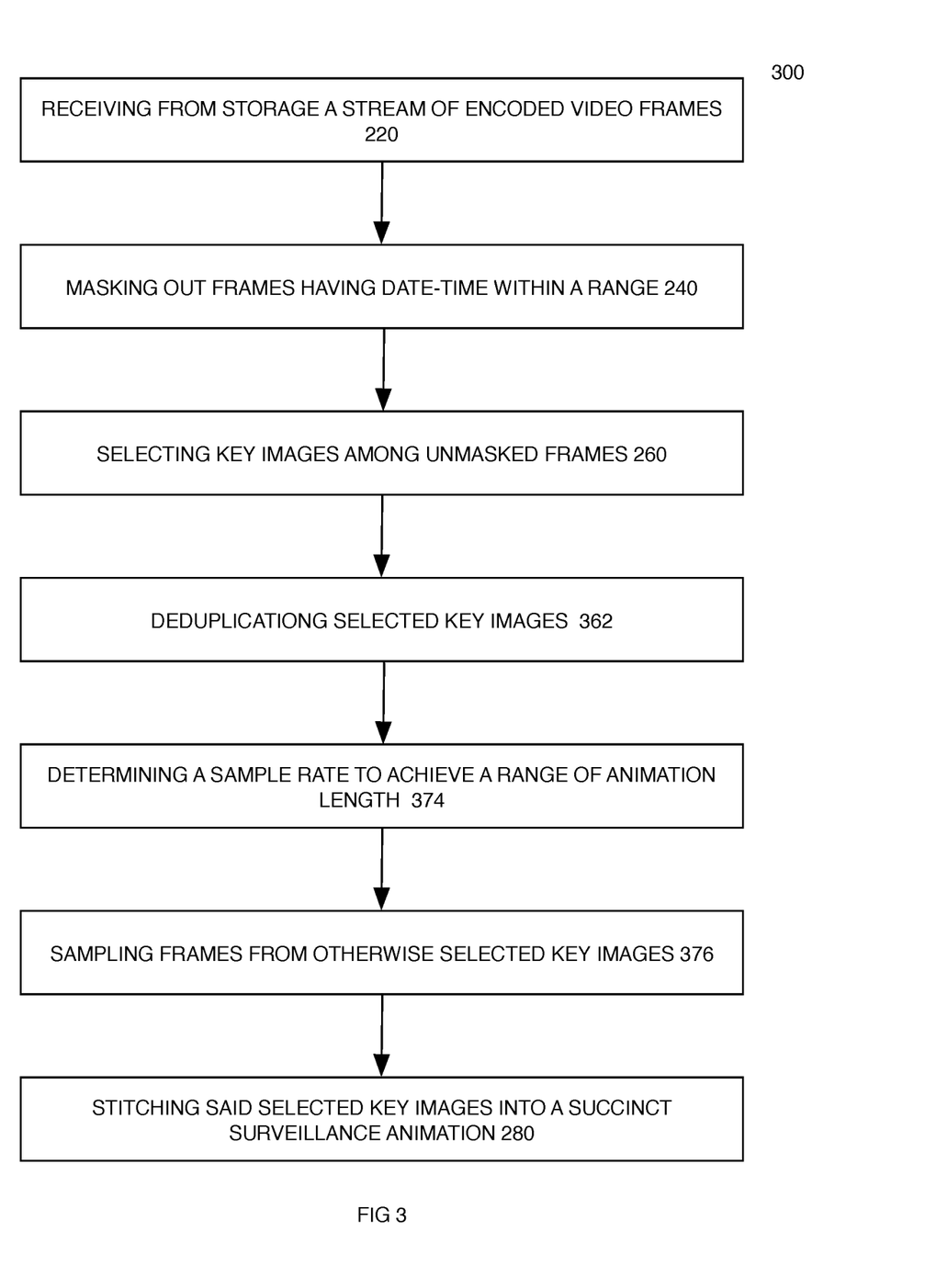
FIG. 3 is a flowchart of a method which meets a desired target of summary run length.

FIG. 3 is a flowchart of a method 300 which meets a desired target of summary run length by receiving from storage a stream of encoded video frames 220; masking out frames having date-time within a range 240; selecting key images among unmasked frames 260; de-duplicating selected key images 362; determining a sample rate to achieve a range of animation length 374; sampling frames from otherwise selected key images 376; and, stitching said selected key images into a succinct surveillance animation 280.

Figure 4:
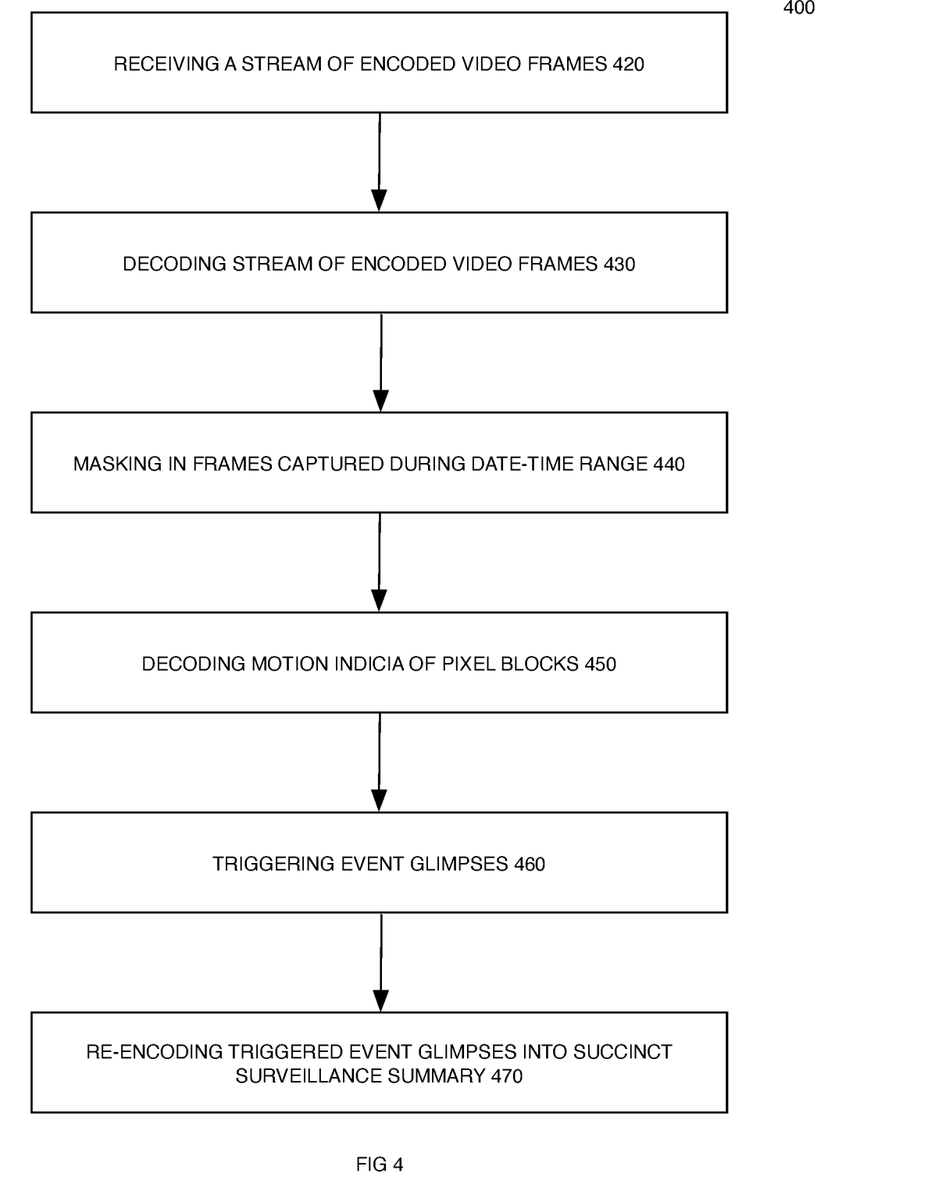
FIG. 4 is a flowchart of a method which uses motion indicia to select frames.

FIG. 4 is a flowchart of a method 400 which uses motion indicia to select frames by receiving a stream of encoded video frames 420; decoding said stream of encoded video frames 430; masking-in (or in an embodiment masking-out) frames captured during a date-time range 440; decoding motion indicia of pixel blocks 450 such as motion vectors, frequency coefficients, or magnitudes; triggering event glimpses 460 for example by motion indicia above a threshold or within a block of pixels; and re-encoding triggered event glimpses into a succinct surveillance summary 470.

Figure 5:
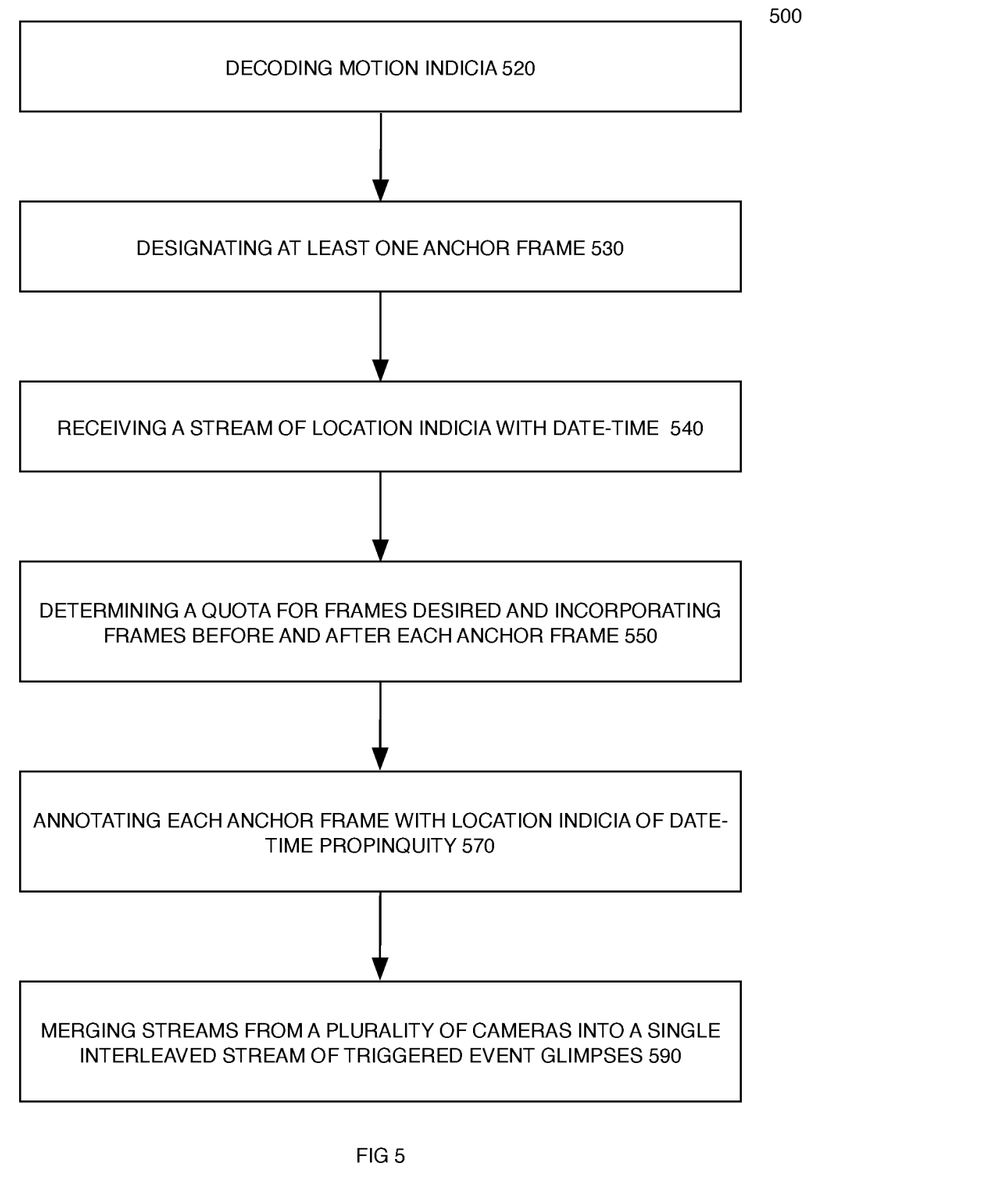
FIG. 5 is a flowchart of a method which adds preroll and postroll frames to provide a glimpse of security events in the summary.

FIG. 5 is a flowchart of a method 500 which also supports body-worn cameras and mobile cameras and adds pre-roll and post-roll frames to provide a glimpse of security events in the summary by decoding motion indicia 520 such as motion vectors, frequency coefficients, and magnitude of data blocks; designating one or more anchor frames 530 by operation on the motion indicia of the encoded video; receiving a stream of location indicia with date-time 540 to add location indicia to the summary; determining a quota for frames desired and incorporating frames before and after each anchor frame 550; annotating each anchor frame with location indicia of date-time propinquity 570; and combines simultaneous events into a single summary stream by merging streams from a plurality of cameras into a single interleaved stream of triggered event glimpses 590.

As is known, an exemplary weighted sample is at least one of:

frames selected by expiration of counter; frames selected by magnitude of frequency bin value; frames selected by an indicia of compression; and frames selected by an indicia of movement activity.

Figure 6:
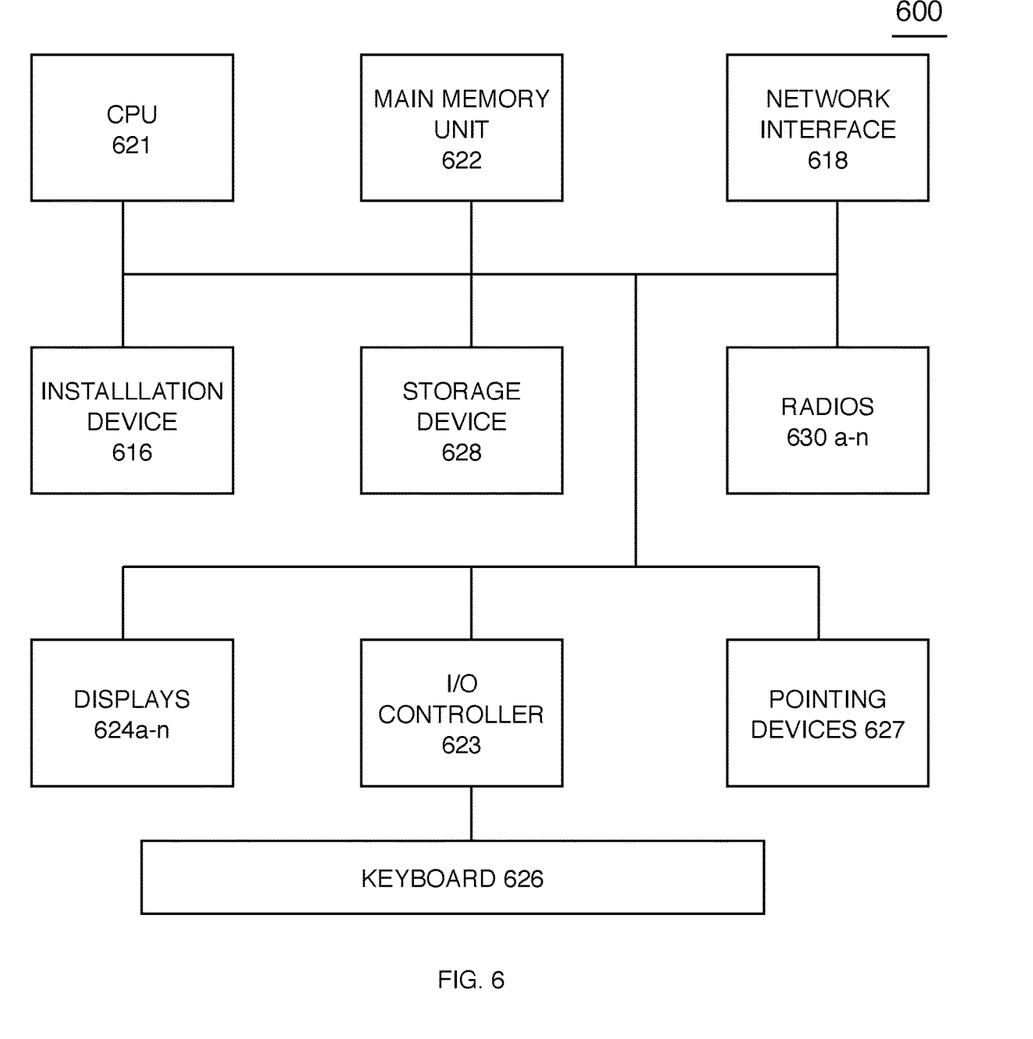
FIG. 6 is a block diagram of a processor suitable for performance of the method according to executable instructions stored in non-transient computer-readable media.

FIG. 6 is a block diagram of an exemplary processor 600 configured by computer executable instructions encoded in non-transitory media to perform the steps, transformations, and decision processes of a method embodiment of the invention.

Another aspect of the invention is a method performed by a plurality of video cameras, a server, and a display cockpit apparatus: at a video camera, capturing a plurality of video frames (stream), compressing said stream into a sequence of key frames (Kframes) and delta frames, and transmitting said compressed stream to a server; at said server, selecting video frames from the stream having indicia of the maximum activity (anchor frames), transforming said anchor frames into still images, reading a stored time and data budget, and storing a summary of surveillance video. The method further includes selecting a delta frame preceding and succeeding said anchor frame to bookend a video glimpse according to the time and data budget, transforming the delta frames into displayable video sequence and storing said video glimpse. The method further includes selecting among the stills and video glimpses into a sequence of entrances, exits, and transits through an area of surveillance.

In an embodiment, the method further includes, submitting still images to an image classification service, determining recognizable persons, animals, or objects from image classification, and determining a table and chart of the stills and glimpses by image classification. The method further includes reading an opt-in opt-out store which masks presentation of summary stills and glimpses. The method further includes associating an index into the video store with each anchor frame which is selectable by the user of a display/cockpit apparatus.

In a process embodiment of the invention, the method also includes the steps: receiving time and data budgets and schedules; receiving indicia of image categories, identification, and masking; submitting still images to an image categorization service; augmenting and annotating images with remarks and tentative identity categories; masking-in and masking-out stills and glimpses according to masking indicia; and receiving selection of index from display/cockpit apparatus and presenting video stream.

Exemplary implementation descriptions as follows may assist in comprehending beneficial aspects of the invention:

In an embodiment, a user's interface offers a new tab under "My Profile" which has "Reports". Under the reports tab I can select "daily summary" which provides selectable a time the report would be sent to subscriber daily, and selection among (e.g. 2-3) cameras that the report will to include.

In an embodiment, the range of allowable length of video is between 15 seconds and 2 minutes.

A report is sent to a user at the specified time and contains videos for the specified cameras or links to the videos.

The invention provides a "Daily Summary Video" for a camera (e.g. limited to 30-60 seconds). It's made of previews only. It's assembled using the motion detection and key frame information.

In an exemplary non-limiting embodiment, determining when XX frames per second video playback (default 10) a product length of 60 seconds video means 60*10=600 frames as a target count.

Determining total number of Key frames and total number of motion segments in last 24 hours.

If there are no frames return "no activity" and don't create a video. If key frames count is between 50% and 150% of target count—generate video using key frames.

When key frames number is less than 50% of target count then multiply up key frames. When number of key frames is over 150% of target then use motion segments.

When using motion segments, and motion segment count is over 50% of target frames generate video using first key frame from each motion segment. When motion segment count is <50% of target use first key frame of each motion segment and multiply up.

When under # of target frames by more than 50% then determining a Key frame Multiplier (KM). KM=target frames/key frame count or first motion segment key frame count.

In an embodiment, Key frames are selected and additional frames are collected around each key frame. If the multiplier is 2 that means 1 frame halfway between the motion segment start and the key frame is selected. If the multiplier is 3 then the method selects one before and one after the keyframe halfway between start/end and the keyframe. If the multiplier is 4 then the method selects 2 before and 1 after. The principle is to add pairs of preceding and succeeding frame for odd number KM and alternate additional preceding or succeeding frames for even number KM.

In another embodiment, the method uses motion segments, and KM key frames after the first are stored into the report.

In an embodiment, a daily summary video is stored into an intermediate saves area under the CAMERA storage area. Apply camera retention to the Daily Summary Video. This is a different Cheap save area then what is exposed as user managed area.

Upon receipt, the Daily Summary offers to be "saved" to the standard Account Level Cheap Saves area saved with or saved without retention applied. Retained daily summaries are retrievable or simply regenerated upon demand.

In a user interface, a Download function provides a summary video on demand with user control over the target length of the video.

In the user interface, a History browser enables Play Daily Summary button to simulates playing a similar video simply by fetching the previews.

The report includes selectable anchor frames, video activity glimpses, and graphic charts of text tables. Changes in video compression efficiency and other event measures of activity distinguish anchor frames in each stream.

Anchor frames are available as still images for display and for image and facial recognition.

A timespan and presentation is determined to bookend each anchor frame to define a video activity glimpse.

To meet time management budgets, the report is transmitted to a display/selection apparatus as a mix of still images and video activity glimpses.

One aspect of the invention is, at a high level of abstraction, a system having a method of operation for a surveillance video activity reporting by: transforming a plurality of video streams into activity anchor frames by triggering on acceleration in compression metrics; storing uncompressed anchor frames as still images for reports and image analysis; determining from subscriber time management budgets a timespan for video glimpses for cognitive comprehension of each anchor frame; synthesizing a report for each subscriber containing a mix of graphical charts, still images and video glimpses in compliance with said time management budget; and transmitting said report and receiving requests to display underlying video streams indexed by the stills, glimpses, and graphical charts.

Another aspect of the invention is a system including: a surveillance video stream transformation apparatus; coupled to at least one subscriber display/selection apparatus; a plurality of surveillance video stream capture apparatuses; a non-transitory store for surveillance video frames, subscriber addresses and parameters, time management budgets, and access method indices; a report synthesis apparatus; and a communication network coupled to the above.

In an embodiment, the system also has: an image recognition apparatus; a facial recognition apparatus; and a graphical chart synthesis apparatus.

Another aspect of the invention is a software controlled apparatus for transforming a plurality of surveillance video streams into a report on events of interest having: a circuit to receive a plurality of surveillance video streams from a network interface; a circuit to determine a peak in video compression inefficiency between successive video frames; a circuit to store an uncompressed video frame as an anchor frame corresponding to the peak compression inefficiency; and a circuit to distribute said anchor frame for at least one of video glimpse identification, image recognition, and report synthesis.

In an embodiment, the apparatus also has: a circuit to read subscriber's video glimpse parameters; a circuit to identify a first video frame identifier preceding said anchor frame to meet said video glimpse parameters; a circuit to identify a second video frame identifier succeeding said anchor frame to meet said video glimpse parameters; and a circuit to store into non-transitory media a plurality of displayable video frames between said first and second video frame identifiers associated with said anchor frame.

In an embodiment, the apparatus also has: a report synthesis circuit to fit multiple windows, stills, glimpses, and graphic charts into subscriber's time management budget and display/selection apparatus.

In an embodiment, the apparatus also has: an image recognition circuit to determine objects and persons from stored indicia.

Another aspect of the invention is a method including: receiving a plurality of surveillance video streams from said plurality of cameras; determining a metric of activity from video compression indicia; deriving a video scene anchor frame identifier from operating on said video compression indicia; storing into non-transitory media a fully uncompressed anchor frame as a still image and an index into an associated associated video stream; distributing to at least one subscriber a report comprising at least one still image within a span of datetime; and receiving from at least one subscriber a request to replay a stream of video indexed from the anchor frame.

In an embodiment, the method also includes: receiving stored video glimpse variables to define parameters of a sequence of video frames; determining a number of preceding and succeeding video frames which bookend said anchor frame to fulfill video glimpse parameters; and storing into non-transitory media a timespan of cognitive video frames in displayable file format.

In an embodiment, the method also includes: determining a subscriber's electronic address for a plurality of surveillance video streams; selecting from stored video glimpses at least one video glimpse within a subscriber's date-time range of interest; synthesizing a display report of video glimpses to scale to subscriber's display/selection apparatus; and transmitting to said subscriber a report containing said video glimpse within said date-time range.

In an embodiment, synthesizing a display report includes: determining a number of multiple windows having activity and scaling the stored video glimpses to fit into the windows.

In an embodiment, synthesizing a display report includes: cutting from a first video glimpse with activity to a second video glimpse with activity upon the event that activity ceases in said first video glimpse.

In an embodiment, synthesizing a display also includes: receiving a time management budget associated with a subscriber; and replacing at least one video glimpses with its anchor frame to meet said time management budget.

In an embodiment, synthesizing a display also includes: receiving a time management budget associated with a subscriber; and shortening the timespan of at least one video scene glimpse to meet said time management budget.

In an embodiment, the method also includes: transferring the anchor frame to an image recognition process and receiving a table of results. In an embodiment, the method also includes displaying a graphic of named persons by date-time received from said image recognition process.

In an embodiment, the method also includes displaying a graphic of object types by date-time received from said image recognition process. In an embodiment, the method also includes suppressing activity reports due to selected named persons. In an embodiment, the method also includes suppressing activity reports on selected object types.

CONCLUSION

The present invention can be easily distinguished from conventional systems by its reversing conventional compression to reveal surveillance activity events of interest and presenting video activity glimpses in a report operative as a control panel.

The present invention can be easily distinguished by determining a target length of the summary in frames from a rate of replay within a time budget.

The present invention can be easily distinguished by selecting frames with based on compression metrics.

The present invention can be easily distinguished by adding additional frames between selected frames based on compression metrics to fulfil a frame count.

The present invention can be easily distinguished by presenting a user with indices to retrieve the original surveillance video.

The present invention can be easily distinguished by presenting a plurality of still images based on decompression of video frames.

The present invention can be easily distinguished by sending still images to an analytic/categorization service.

The present invention can be easily distinguished by annotating still images with remarks and categories provided by an analytic/categorization service.

The present invention can be easily distinguished by presenting tables on categories provided by an analytic/categorization service.

The present invention can be easily distinguished by transforming video streams into a chart or graphic of categories of content.

The present invention can be easily distinguished by editing the summary according to opt-in or opt-out of selected categories of content.

As is known, circuits disclosed above may be embodied by programmable logic, field programmable gate arrays, mask programmable gate arrays, standard cells, and computing devices limited by methods stored as instructions in non-transitory media.

Generally a computing devices 600 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A computing device may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on a computing device.

FIG. 6 depicts block diagrams of a computing device 600 useful for practicing an embodiment of the invention. As shown in FIG. 6, each computing device 600 includes a central processing unit 621, and a main memory unit 622. A computing device 600 may include a storage device 628, an installation device 616, a network interface 618, an I/O controller 623, display devices 624a-n, a keyboard 626, a pointing device 627, such as a mouse or touchscreen, and one or more other I/O devices 630a-n such as baseband processors, Bluetooth, GPS, and Wi-Fi radios. The storage device 628 may include, without limitation, an operating system and software.

The central processing unit 621 is any logic circuitry that responds to and processes instructions fetched from the main memory unit 622. In many embodiments, the central processing unit 621 is provided by a microprocessor unit, such as: those manufactured under license from ARM; those manufactured under license from Qualcomm; those manufactured by Intel Corporation of Santa Clara, Calif.; those manufactured by International Business Machines of Armonk, N.Y.; or those manufactured by Advanced Micro Devices of Sunnyvale, Calif. The computing device 600 may be based on any of these processors, or any other processor capable of operating as described herein.

Main memory unit 622 may be one or more memory chips capable of storing data and allowing any storage location to be directly accessed by the microprocessor 621. The main memory 622 may be based on any available memory chips capable of operating as described herein.

Furthermore, the computing device 600 may include a network interface 618 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 600 communicates with other computing devices 600 via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 600 to any type of network capable of communication and performing the operations described herein.

A computing device 600 of the sort depicted in FIG. 6 typically operates under the control of operating systems, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 10, manufactured by Microsoft Corporation of Redmond, Wash.; MAC OS and iOS, manufactured by Apple Inc., of Cupertino, Calif.; or any type and/or form of a Unix operating system.

In some embodiments, the computing device 600 may have different processors, operating systems, and input devices consistent with the device. In other embodiments the computing device 600 is a mobile device, such as a JAVA-enabled cellular telephone or personal digital assistant (PDA). The computing device 600 may be a mobile device such as those manufactured, by way of example and without limitation, Kyocera of Kyoto, Japan; Samsung Electronics Co., Ltd., of Seoul, Korea; or Alphabet of Mountain View Calif. In yet other embodiments, the computing device 600 is a smart phone, Pocket PC Phone, or other portable mobile device supporting Microsoft Windows Mobile Software.

In some embodiments, the computing device 600 comprises a combination of devices, such as a mobile phone combined with a digital audio player or portable media player. In another of these embodiments, the computing device 600 is device in the iPhone smartphone line of devices, manufactured by Apple Inc., of Cupertino, Calif. In still another of these embodiments, the computing device 600 is a device executing the Android open source mobile phone platform distributed by the Open Handset Alliance; for example, the device 600 may be a device such as those provided by Samsung Electronics of Seoul, Korea, or HTC Headquarters of Taiwan, R.O.C. In other embodiments, the computing device 600 is a tablet device such as, for example and without limitation, the iPad line of devices, manufactured by Apple Inc.; the Galaxy line of devices, manufactured by Samsung; and the Kindle manufactured by Amazon, Inc. of Seattle, Wash.

As is known, circuits include gate arrays, programmable logic, and processors executing instructions stored in non-transitory media provide means for scheduling, cancelling, transmitting, editing, entering text and data, displaying and receiving selections among displayed indicia, and transforming stored files into displayable images and receiving from keyboards, touchpads, touchscreens, pointing devices, and keyboards, indications of acceptance, rejection, or selection.

It should be understood that the systems described above may provide multiple ones of any or each of those components and these components may be provided on either a standalone machine or, in some embodiments, on multiple machines in a distributed system. The phrases in one embodiment', in another embodiment', and the like, generally mean the particular feature, structure, step, or characteristic following the phrase is included in at least one embodiment of the present disclosure and may be included in more than one embodiment of the present disclosure. However, such phrases do not necessarily refer to the same embodiment.

The systems and methods described above may be implemented as a method, apparatus or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be PHP, PROLOG, PERL, C, C++, C #, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip, electronic devices, a computer-readable non-volatile storage unit, non-volatile memory, such as semiconductor memory devices, including EPROM, EEPROM, and flash memory devices; magnetic disks such as internal hard disks and removable disks; magneto-optical disks; and nanostructured optical data stores. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for video surveillance, it will now become apparent to one of skill in the art that other embodiments incorporating the concepts of the disclosure may be used. Therefore, the disclosure should not be limited to certain embodiments, but rather should be limited only by the spirit and scope of the following claims.

We claim:

1. A method performed by an apparatus to transform video surveillance files into a visual summary of security events associated with motion, the method comprising steps as follows:
   receiving at least one stream of encoded video frames from computer-readable non-transient media;
   decoding said at least one stream of encoded video frames;
   masking-in frames captured during a date-time range of said decoded video frames;
   decoding motion indicia of pixel blocks within said masked-in frames;
   triggering event glimpses by said motion indicia of pixel blocks;
   re-encoding said triggered event glimpses into a succinct surveillance summary, whereby a stream of encoded video frames is transformed by an apparatus into a visual summary of security events associated with motion captured within a date-time range; wherein triggering event glimpses comprises:
   designating at least one anchor frame by motion indicia within pixel blocks above a threshold value;
   determining a quota for video frames desired for said visual summary of security event; and
   incorporating video frames before and after each anchor frame until said quota is fulfilled, wherein said quota is a value within a range of values.

2. A method performed by an apparatus to transform video surveillance files into a visual summary of security events associated with motion, the method comprising steps as follows:
   receiving at least one stream of encoded video frames from computer-readable non-transient media;
   decoding said at least one stream of encoded video frames;
   masking-in frames captured during a date-time range of said decoded video frames;
   decoding motion indicia of pixel blocks within said masked-in frames;
   triggering event glimpses by said motion indicia of pixel blocks;
   re-encoding said triggered event glimpses into a succinct surveillance summary, whereby a stream of encoded video frames is transformed by an apparatus into a visual summary of security events associated with motion captured within a date-time range;
   receiving a plurality of streams of encoded video frames captured at one or more cameras from computer-readable non-transient media;
   annotating location indicia to each video frame;
   merging streams from the plurality of cameras into a single interleaved stream of event glimpses; and
   encoding a split screen view of event glimpses which overlap in date-time.

3. A system comprising at least one network coupling
   a plurality of fixed location surveillance cameras and body-worn surveillance cameras and
   a plurality of mobile displays to
   an apparatus for transforming streams of encoded video frames into a succinct surveillance animation, wherein said apparatus comprises: a processor, coupled to, at least:
   a computer-readable non-transitory media for storage,
   a circuit for stitching selected video frames into a visual summary of security events,
   a circuit for decoding and encoding video frames,
   a circuit for decoding motion and location indicia,
   a circuit for sampling and de-duplicating video frames, and
   a circuit for excluding video frames by date-time and by motion indicia.

* * * * *